Patented Apr. 4, 1950

2,502,520

UNITED STATES PATENT OFFICE 2,502,520

PREPARATION OF MOLDING POWDER CONSISTING ESSENTIALLY OF STARCH AND AN AMINOTRIAZINE - FORMALDEHYDE RESIN

Donald W. Hansen, Decatur, Ill., assignor to A. E. Staley Manufacturing Company, Decatur, Ill., a corporation of Delaware No Drawing. Application September 21, 1946, Serial No. 698,435

4 Claims. (Cl. 18—48)

This invention has to do with improvements in preparing molding compositions. More particularly, it relates to preparing molding compositions comprising combinations of a starchy material and a condensation product of an amino triazine with an aldehyde. Still more specifically, it pertains to an improved process for manufacturing this particular class of molding compositions, characterized by milling the starchy material and triazine-aldehyde condensation product between relatively movable members at controlled temperatures and at relatively high moisture levels.

The present application is a continuation-in-part of my copending application filed January 20, 1943 and bearing Serial No. 472,995, now U. S. Patent No. 2,408,065.

This invention is based upon the discovery that, in the preparation of a molding composition comprising a predominant proportion of starch and a minor proportion of a thermosetting condensation product of an amino triazine with an aldehyde, a surprisingly improved product is obtained by departing from the conventional methods of preparing molding compositions of this type. This departure consists of milling the starchy material and triazine-aldehyde condensation product together at moisture levels considerably above those regarded as suitable in the final molding composition and then drying the milled product to a suitably low moisture content before it is molded. The duration, temperature, and pH of the milling treatment are controlled so that any attending curing of the triazine-aldehyde condensation product is insufficient to prevent proper thermoplastic flow of the composition when molded.

An object of the invention is to produce a molding composition containing a major proportion of starchy material and a minor proportion of a thermosetting amino triazine-aldehyde condensation product from which can be made molded products which are economical of manufacture and substantially on a par with conventional molded products made without starch as an extender.

Another object of the invention is the provision of a novel process for preparing molding compositions containing major proportions of starchy material and minor proportions of a thermosetting amino triazine-aldehyde condensation product, whereby molded products made from such compositions have superior strength, water resistance, and clarity in comparison with those made from the same compositions prepared by conventional methods.

Other objects of the invention will in part be obvious and will in part appear hereinafter.

The invention accordingly comprises the several steps and the relationship of one or more of such steps with respect to each of the others which are exemplified in the following detailed description and whose scope of application will be indicated in the claims.

As indicated above, the present invention contemplates a molding composition consisting chiefly of a starchy material and a thermosetting or resin-forming amino triazine-aldehyde condensation product which have been melted together, the former being present in a major proportion. As the starchy component, I may use unmodified isolated starch such as that obtained from any of the well known cereal or tuberous sources of starch, or any of the various modified starches such as those obtained by mild oxidation with such agents as chlorine, hypochlorites, and permanganates, by mild treatment with acids or bases, or by heat treatment alone. Alternatively, I may use starch-rich materials such as the flours that may be prepared from starchy tubers and grains. Preferably, however, I use unmodified isolated starch as the starchy component of the molding compositions. As the resin-forming component, I may use any of the various water soluble thermosetting condensation products which may be prepared by reacting an amino triazine with an aldehyde. Several products of this class are described in United States Patent No. 2,197,357. I prefer to use such products prepared from melamine and formaldehyde.

In view of the known hydrophylic property of starch, it is unexpected to find that molded products made from molding compositions containing about 75% starch and prepared in accordance with this invention exhibit especially high resistance to water. Also, in view of the chemical resemblance of starch to cellulose and the well known fact that molding compositions containing high proportions of cellulose have very poor plastic flow, it is equally unexpected to find that substitution of starch for cellulose at the high cellulose levels yields molding compositions which flow quite satisfactorily when hot pressed. Also, the molded products made from molding compositions according to this invention and containing about 75% starch possess high flexural strength, a property not clearly to be anticipated from the non-fibrous structure of starch and the known structural weakness of starch masses in general. The plastic flow of a 75% starch molding composition prepared in accordance with this invention, and the water resistance of products molded therefrom, compare favorably with those properties of conventional molding compositions and derived molded products.

The molding compositions embraced by this invention require only moderate pressures in the molding operation, owing to their high plastic flow at moderately elevated temperatures, and cure rapidly when molded at a temperature of about 150° C. Also, they are capable of being stored for long periods of time without undergoing significant alterations in those properties. Products molded from such compositions are substantially colorless and have desirable light transmitting properties.

In accordance with this invention, the principal components of the molding composition, starchy material and amino triazine-aldehyde condensation product, are milled together under suitable conditions of time, temperature, and pH at moisture levels substantially above those heretofore employed in preparing molding compositions of this type. The milling action should consist of more than mere mixing; it should involve the application of substantial shearing stresses to the milled material, and preferably those stresses should have the order of magnitude of those developed on the differential rolls commonly used in the plastic and rubber industries. The combination of high shearing stress and high moisture produces a beneficial increased degree of mixing of the components or modification of the starchy material not obtainable either by merely mixing the high-moisture content materials or by milling the materials at conventional low moisture levels. Molded articles made from molding compositions prepared in accordance with this invention have substantially greater flexural strength, water resistance, and clarity than those made from the same molding compositions compounded by conventional methods.

The preferred method of compounding the starchy material with the resin-forming material is first to dissolve the latter in all or a part of that proportion of water which, when added to the moisture present in the former, will provide the desired proportion of moisture in the mixture to be milled. The aqueous solution of resin-forming material, together with any necessary additional water, is then thoroughly mixed with the finely powdered starchy material in any suitable device such as, for example, either a Hobart mixer or a kneader type mixer. After the powdered starchy material and aqueous solution of resin-forming material have been thoroughly blended, the resulting mixture, granular and apparently dry in appearance, is subjected to the pressure and shearing stresses of suitable milling action, such as, for example, that provided by differential rolls. The milled material is then preferably dried and ground to a coarse powder before it is used for molding purposes.

The moisture content of the mixture to be milled is regulated on the basis of the kind and proportion of starch that is present. For starches in general, the proportion of water based on the total composition lies within the range of about 10% to about 40%. If the mixture is too dry it passes through the milling device in a granular or powdery state with low absorption of power and without appreciable alteration in either the properties of the starch or the final molded articles. On the other hand, if the mixture is too moist, it passes through the milling device in an extremely plastic or rubbery condition, again with low absorption of power and with but slight change in properties. At suitable intermediate moisture levels, the apparently dry mixture passes through the mill with greatly increased absorption of power and with substantial change in the properties of the starchy component. When mixtures having the correct moisture contents are milled on differential rolls, the material usually becomes momentarily fluid or extremely plastic in the nip of the rolls. In this transient state, the milled material also assumes a translucent or almost transparent appearance. The starch granules are distorted and more or less ruptured, depending upon the temperature and moisture conditions, and the resin-forming material is worked into them or combined with them in such a way by this treatment that molded products made from the molding composition thus obtained possess distinctly superior strength, water resistance, and clarity characteristics.

When using isolated starches, or modified isolated starches, as the starchy component of the molding composition, the approximate operating limits with respect to moisture contents of the total mixure to be milled are as follows:

| Kind of Starch | Per cent Moisture Based on Total Composition | |
| --- | --- | --- |
|  | Lower Limit | Upper Limit |
| Corn | 17 | 34 |
| Waxy Maize | 12 | 35 |
| Rice | 10 | 35 |
| Wheat | 15 | 37 |
| Tapioca | 11 | 38 |
| Sweet Potato | 11 | 38 |
| Irish Potato | 11 | 40 |
| Sorghum | 11 | 40 |

Thus, when using corn starch, the total composition or mixture to be milled should not contain less than about 17% moisture, nor more than about 34% moisture.

The optimum percentages of moisture in mixtures to be milled containing the foregoing starches lie about midway between the tabulated upper and lower limits. For example, the optimum moisture content of a mixture of corn starch and resin-forming material is about 25 or 26 per cent.

The moisture ranges cited in the foregoing table apply also when the starch is present in an impure state, as is the case when a flour or other other starch-rich material is used in place of isolated starch.

Milling of the mixture of starchy and resin-forming materials at moisture and temperature levels which cause pasting or rupturing of the starch granules is not detrimental provided it is not accompanied by excessive curing of the resin-forming material. Another consideration affecting the time and temperature of the milling treatment is the loss of moisture from the milled material during this treatment. These two factors must be regulated so as to avoid reduction in moisture below the critical value before the treatment is completed. Such reduction in moisture content does not occur, however, when the milling is carried out on differential rolls under proper conditions of time, temperature and original moisture content.

In compounding a molding composition comprising corn starch and a water soluble condensation product of melamine and formaldehyde on differential rolls, the milling time is relatively short, usually not exceeding about five minutes. I have found that the maximum permissible temperature of the milled mixture under these circumstances, as indicated by the temperature of of the rolls, is about 120° C. That is, milling at temperatures above this either dry out the mixture too rapidly or cause so much curing of the resin-forming material that the molding composition lacks sufficient plastic flow for satisfactory molding.

Aside from any consideration of the cost of cooling the milling apparatus, which always develops considerable heat during its operation, the preferred milling temperature is near room temperature, i. e., in the neighborhood of about 30° C. At this temperature, the mixture of starchy and resin-forming materials can be milled long enough to develop maximum increases in the strength, water resistance, and clarity of products molded therefrom without running the risk of evaporating too much moisture or causing too much premature curing of the resin-forming component.

When the cooling cost has to be considered, the preferred milling temperature will then depend upon a balancing of this cost against the improved properties of the products molded from the milled material. In no case, however, will this temperature exceed an upper limit of about 120° C.

The general effects of time, temperature, and pH on the curing or hardening of condensation products of amino triazines and aldehydes, especially those of melamine and formaldehyde, are well known. The catalytic effect of hydrogen ion concentration on the rate of condensation is minimum at slight alkalinity, i. e., in the neighborhood of about 9 pH, and increases as the pH is either raised or lowered. Consequently, maximum stability of the molding composition during storage is obtained by imparting to it a slight degree of alkalinity. This can be done by incorporation of small proportions of any suitable alkaline material with the composition. Lime is preferred because of its low cost and also because of the superior shock resistance that it imparts to the molded articles.

If good storage stability and lack of extremely rapid curing during molding are desired, the pH of the molding composition should be within the pH range of about 6.5 to 11. Freshly prepared compositions having pH values lying outside this range can be used with some degree of success, but their flow decreases steadily with storage age, especially at elevated temperatures, and because of their rapid curing during molding, they are limited to the preparation of molded objects with relatively simple designs.

Within the preferred pH range of about 6.5 to 11, the plastic flow of the molding compositions is affected to a large extent by the moisture content of the composition. Thus it was found that a composition consisting of about three parts of corn starch and one part of water soluble melamine-formaldehyde condensation product, and adjusted to about 9 pH with lime, had a flow of about 45 mils at a moisture content of 5%, a flow of about 90 mils at a moisture content of 7%, and a flow of about 160 mils at a moisture content of 8%. At a given moisture content, the flow of compositions containing the same proportion of starch to resin forming material increases slowly with increasing pH within the preferred pH range, but decreases as the pH is either increased or decreased outside of this range. An acid, such as hydrochloric acid for example, may be used to lower the pH of the molding composition.

The preferred method of milling the mixture of starchy and resin-forming materials is to pass it several times through differential rolls of the general type used in the rubber and plastic industries. In general, these rolls comprise a pair of smooth, horizontally mounted rolls spaced a very short distance apart on parallel shafts and separately and positively rotated at different peripheral speeds in opposite directions. Unless the rolls are operated intermittently or at very slow speed, they must be cooled in some manner to absorb the heat generated and to prevent overheating of the milled material. For this purpose the rolls are preferably made hollow and cold water or other cooling fluid is circulated through them. As the material is drawn through the rolls, it is subjected to a combination of pressure and shearing action that is very effective in producing the beneficial effects of this invention.

Other means for applying pressure and shearing action to the mixture of starchy and resin-forming materials properly to practive the invention will be recognized by those skilled in the art.

In regard to differential rolls, the spacing between them, their diameter, their peripheral speeds, and the ratio of their peripheral speeds all affect the degree of milling imparted to the starch-resin mixture within a given time. Of these factors the roll spacing is the most critical. If this spacing is too great, shearing action is confined to the outside layers of the strip passing through the rolls, and the inner portion of the strip is relatively unaffected. On the other hand, if the spacing is too small, the power consumed per unit quantity of milled material is disproportionately high, and in addition to this the output of the rolls is greatly diminished. Roll spacings ranging from 0.003 to 0.030 inch have been successfully used. With large diameter well cooled rolls operating at relatively high speeds and high differential ratios, and by passing the material through the rolls a sufficient number of times, it is possible to obtain satisfactory milling at even somewhat greater roll spacings.

Ordinarily, both rolls are of the same diameter, but this is not essential. The diameters of the rolls may be varied to suit the needs and preferences of the manufacturer of the molding composition. Assuming that the rolls are of equal diameter, their diameter affects their ability to bite into the feed material, which in turn affects the rate of which the starch-resin mixture passes through the rolls. Other things being equal, large diameter rolls take more "bite" than do those of smaller diameter. The roll diameter also affects the degree of working received by the feed material per pass through the rolls. The area through which severe working of the feed material occurs in small diameter rolls is narrow and approaches a line as the roll diameter becomes less and less. Increasing the roll diameter increases the width of the effective working zone and thus increases the distance and the time in which the shearing stresses can effectively act on the feed during a single pass through the rolls. For this reason, a given number of passes through a pair of large diameter rolls may produce the same degree of improvement in the final molded article as twice or more times this number of passes through a pair of smaller diameter rolls, other conditions being equal.

The peripheral speeds of the rolls may also be varied over a wide range of values without departing from the scope of this invention. Peripheral speeds of the fast roll ranging from 25 to 250 feet per minute have been successfully used. Other things remaining unchanged, shearing stresses on the feed material, and hence modification of the same, increase with increasing peripheral speeds of the rolls. Output of milled product per unit of time from a pair of rolls also increases with increasing peripheral speed.

The ratio of the peripheral speed of the fast moving roll to that of the slow moving roll is known as the friction or differential ratio. It, too, may be varied over a relatively wide range of values. For example, it may be as high as 3 to 1 or as low as 1.1 to 1. For most general purposes, a differential ratio of about 1.25 to 1 is preferred. Shearing action on the feed material increases with increasing friction ratio. Consequently, the same degree of modification can be accomplished with rolls operating at high peripheral speeds and low friction ratio as with rolls operating at low peripheral speeds and a high friction ratio.

With respect to keeping the milling temperature below its critical value of about 120° C., it is to be understood that means other than cooling the milling device are available for this purpose. Since the heat is developed by friction, any means for controlling the friction within suitable limits may be used. For example, friction is decreased by increasing the spacing between the relatively movable surfaces of the milling device, or by decreasing the actual and differential speeds of these surfaces. In general, however, it will be found that controlling the feed temperature by controlling the friction tends to increase greatly the time required to obtain the desired improvement in the product, and for that reason cooling of the milling device with a fluid such as water or air is the preferred method for controlling this temperature.

The invention is more specifically illustrated by the following examples, in which all parts are by weight and all starches used contain about 12% moisture, unless otherwise specified.

*Example 1*

25 parts of a commercial melamine-formaldehyde condensation product in powder form was dissolved in 12½ parts of water. 75 parts of commercial corn starch was thoroughly mixed with 0.05 part of lime and 5 parts of water. The aqueous solution of melamine-formaldehyde condensation product was then added slowly to this mixture with vigorous stirring in a Hobart mixer, and mixing was continued for 30 minutes after all the solution was added in order to insure complete uniformity of the mixture. The mixture, having the appearance of moist granular starch, was then milled for 3 minutes on hollow differential rolls cooled with circulating water having a temperature of about 25° C. At the end of the 3 minute period, the strip of milled material was cut from the rolls and ground to pass a No. 10 sieve. It was then dried in a current of moderately warm air to a moisture content of about 6%. The composition thus obtained had a pH of 7.1 and a flow of 92 mils. A test disk 2 inches in diameter and ⅛ inch thick, and a test bar, 3″ x ¼″ x ¼″, molded from this composition at a pressure of 5000 pounds per square inch, at a temperature of 150° C., and at a molding time of 3 minutes, and conditioned for 1 hour at 105° C., was clear and light colored and had a flexural strength of 10,000 pounds per square inch and a water absorption of 1.6%.

Test specimens molded from a molding composition prepared the same way except for omission of the milling step were much cloudier in appearance and had a flexural strength of only about 6000 pounds per square inch and a water absorption of about 3.5%.

*Example 2*

This milled composition was prepared in exactly the same way as that described in Example 1, except that 0.1 part of lime, instead of 0.05 part, was used. The molding composition thus obtained had a pH of 9.1 and a flow of 172 mils. The clear test disk molded from this composition had a flexural strength of 10,200 pounds per square inch and a water absorption of 1.5%.

Test specimens molded as described in Example 1 from a composition prepared the same way except for omission of the milling step were much more opaque, and had a flexural strength of only 6100 pounds per square inch and a water absorption of 3.4%.

*Example 3*

A molding composition was prepared in exactly the same way as that described in Example 1, except that 0.6 part of lime and 0.6 part of ammonium chloride, instead of 0.01 part of lime, were used. The milled and dried product thus obtained had a pH of 8.4 and a flow of 47 mils. Test specimens molded as described in Example 1 from this composition, clear and almost colorless, had a flexural strength of 9950 pounds per square inch and a water absorption of 1.8%.

*Example 4*

30 parts of the same kind of commercial melamine-formaldehyde condensation product used in the foregoing examples was dissolved in 15 parts of water. This was added slowly with vigorous stirring in a Hobart mixer to a mixture of 70 parts of commercial corn starch and 0.6 part of lime. Mixing was continued for 30 minutes after all the solution was added to the starch in order to insure complete uniformity of the mixture. The granular material thus obtained was milled, dried and ground as described in Example 1. The dried granular product had a pH of 9.9 and a flow of 155 mils. Test specimens molded as described in Example 1 from this composition, clear and nearly colorless, had a flexural strength of 14,250 pounds per square inch and a water absorption of 1.0%.

Test specimens molded as described in Example 1 from a composition prepared as described above except for omission of the milling step had a water absorption of 2.5% and a flexural strength of only 7200 pounds per square inch.

Example 5

81 parts of a neutral aqueous solution of formaldehyde, containing 37% formaldehyde by weight, and 50.4 parts of melamine were heated together at 80° C. for 30 minutes. 121 parts of the resulting solution of condensation product was mixed with 150 parts of powdered commercial corn starch, milled, and dried to 6% moisture as described in Example 1. The resulting composition had a pH of 6.8 and a flow of 88 mils. Test specimens molded as described in Example 1 from this composition had a water absorption of 1.5% and a flexural strength of about 9000 pounds per square inch.

Example 6

A composition was prepared in the same way as described in Example 4 except that the quantities of starch, resin-forming material, water, and lime were changed to 51, 49, 20, and 0.05 parts respectively. The molding composition thus prepared had a pH of 7.0 and a flow of 225 mils. Test specimens molded from it as described in Example 1 had a water absorption of about 0.1% and a flexural strength of 9,100 pounds per square inch.

Example 7

This composition was prepared as described in Example 4 except that the quantities of starch, resin-forming material, water and lime were changed to 63, 37, 18.4, and 0.05 parts respectively. The composition thus obtained had a pH of 7.1 and a flow of 150 mils. Test specimens molded from it as described in Example 1 had a water resistance of 0.3% and a flexural strength of 10,600 pounds. The test specimens were quite translucent and nearly colorless.

Example 8

A composition was prepared in the same way as described in Example 4 except that the quantities of starch and resin-forming material water were changed to 85 and 15 parts respectively. The molding composition prepared in this way had a pH of 9.8 and a flow of 60 mils. A test disk molded from it as described in Example 1, translucent and nearly colorless, had a water absorption of 4.6% and a flexural strength of 9100 pounds per square inch.

Example 9

Wheat flour containing 76% starch, 12% protein, and 12% moisture was substituted for the powdered corn starch in Example 4. The molding composition thus prepared had a pH of 9.5 and a flow of 140 mils. Test specimens molded from it as described in Example 1, having the same general appearance as the specimens molded in Example 4, had a water resistance of 1.2% and a flexural strength of 12,200 pounds per square inch.

Example 10

White potato flour containing 79% starch and 12% moisture was substituted for the corn starch in Example 4. This gave a molding composition with much the same appearance and other properties as that obtained from the corn starch. It had a pH of 9.6 and a flow of 160 mils. Test specimens molded from it as described in Example 1 were clear and almost colorless. These specimens had a water resistance of 1.1% and a flexural strength of 13,200 pounds per square inch.

Example 11

Dried and powdered "mill starch" or "table heads" containing 83% starch, 5% mixed protein and fiber, and 12% moisture, was substituted for the powdered commercial corn starch in Example 4. "Mill starch" is the crude starch obtained in the wet milling of corn after the hull, germ and most of the fibers have been separated from the starch. The molding composition thus obtained had a pH of about 9.4 and a flow of 125 mils. Test specimens molded from it as described in Example 1, while being somewhat darker in color, were otherwise much the same as those obtained in Example 4. They had a water absorption of 1.1% and a flexural strength of 13,800 pounds per square inch.

Example 12

Powdered commercial tapioca starch was substituted for the corn starch in Example 4. This gave a molding composition having a pH of 9.7 and a flow of 160 mils. Test specimens molded from it as described in Example 1 were clear and almost colorless. They had a water resistance of 1.1% and a flexural strength of 14,000 pounds per square inch.

All of the foregoing compositions were compounded on a pair of hollow differential rolls, each of which had an external diameter of 6 inches. One of the rolls was rotated at a peripheral speed of 45 feet per minute, and the other was rotated in the opposite direction at a peripheral speed of 36 feet per minute, thus providing a friction or differential ratio of 1.25. These peripheral speeds were held constant throughout all the foregoing examples.

Examinations of the foregoing molding compositions and test specimens molded therefrom were conducted as follows:

*pH of the molding composition.*—Ten grams of the granular material was stirred for 1 hour at room temperature with 100 ml. of distilled water, and the pH of the supernatant water was then determined with a glass electrode.

*Moisture content of the molding composition.*—About 2 grams of the granular material was weighed before and after drying in an oven at 105° C. for three hours. The measured loss in weight was assumed to be the moisture content of the sample.

*Plastic flow of the molding composition.*—A preformed cylindrical pellet of the granular material ⅜" in diameter and ⅜" long was placed endwise between two platens, each maintained at a temperature of 150° C. A 5 kilogram load was immediately placed on the upper movable platen. Under the heat and pressure thus applied to it, the pellet flattens for a period of time until the heat reactive resin-forming material contained therein hardens and prevents further flow. The decrease in height of the pellet, measured in mils, i. e., thousandths of inches, is arbitrarily termed the plastic flow or simply the flow of the composition.

*Water absorption of the molded article.*—For the determination of this property, a disk 2 inches in diameter and ⅛ inch thick was molded at 150° C. for 3 minutes at a pressure of 5000 pounds per square inch, and then conditioned for 1 hour at 105° C. This disk was weighed and then immersed on an edge in water at 25° C. for 24 hours. The disk was then removed from the water, wiped dry, and weighed again. The gain in weight was taken as the water absorbed, and was reported in parts per hundred parts of original disk.

*Flexural strength of the molded article.*—For the determination of this property, test bars ¼" square and about 3" long were molded, then suspended on knife edges 2" apart and loaded at the mid point with increasing weights until the bars broke. Flexural strength was then calculated according to the regular A. S. T. M. procedure.

Since certain changes in carrying out the above process which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In the preparation of a molding powder consisting essentially of starch and an amino triazine-aldehyde resin, the improvement which comprises, milling together under pressure without appreciable loss of moisture a granular mixture comprising a minor proportion of an amino triazine-aldehyde resin and a major proportion of starch, the resin-starch mass being milled having a moisture content within the range shown in the following table depending upon the particular type of starch used:

| Kind of Starch | Per cent Moisture Based on Total Composition | |
|---|---|---|
| | Lower Limit | Upper Limit |
| Corn | 17 | 34 |
| Waxy Maize | 12 | 35 |
| Rice | 10 | 35 |
| Wheat | 15 | 37 |
| Tapioca | 11 | 38 |
| Sweet Potato | 11 | 38 |
| Irish Potato | 11 | 40 |
| Sorghum | 11 | 40 |

2. The improvement called for in claim 1 wherein said resin-starch mixture contains approximately 75 parts by weight of starch and approximately 25 parts by weight of resin.

3. The method of preparing a molding powder consisting essentially of starch and an amino triazine-aldehyde resin, which comprises preparing a granular mixture comprising a minor proportion of an amino triazine-aldehyde resin and a major proportion of starch, said mixture having a moisture content within the range shown in the following table, depending upon the particular type of starch used, milling said granular resin-starch mixture under pressure without appreciable loss of moisture, and drying the resulting milled product so as to remove a substantial proportion of its moisture content:

| Kind of Starch | Per cent Moisture Based on Total Composition | |
|---|---|---|
| | Lower Limit | Upper Limit |
| Corn | 17 | 34 |
| Waxy Maize | 12 | 35 |
| Rice | 10 | 35 |
| Wheat | 15 | 37 |
| Tapioca | 11 | 38 |
| Sweet Potato | 11 | 38 |
| Irish Potato | 11 | 40 |
| Sorghum | 11 | 40 |

4. The method called for in claim 3 wherein said resin-starch mixture contains approximately 75 parts by weight of starch and approximately 25 parts by weight of resin.

DONALD W. HANSEN.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,229,291 | Groten et al. | Jan. 21, 1941 |
| 2,400,820 | Glarum et al. | May 21, 1946 |